US011908457B2

(12) United States Patent
Lee et al.

(10) Patent No.: US 11,908,457 B2
(45) Date of Patent: Feb. 20, 2024

(54) ORTHOGONALLY CONSTRAINED MULTI-HEAD ATTENTION FOR SPEECH TASKS

(71) Applicant: QUALCOMM Incorporated, San Diego, CA (US)

(72) Inventors: Mingu Lee, Hwaseong (KR); Jinkyu Lee, Seoul (KR); Hye Jin Jang, Seattle, WA (US); Kyu Woong Hwang, Daejeon (KR)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 16/920,519

(22) Filed: Jul. 3, 2020

(65) Prior Publication Data

US 2021/0005183 A1    Jan. 7, 2021

Related U.S. Application Data

(60) Provisional application No. 62/870,382, filed on Jul. 3, 2019.

(51) Int. Cl.
| | | |
|---|---|---|
| *G10L 15/16* | (2006.01) | |
| *G06N 3/08* | (2023.01) | |
| *G06N 3/044* | (2023.01) | |
| *G10L 15/08* | (2006.01) | |

(52) U.S. Cl.
CPC .............. *G10L 15/16* (2013.01); *G06N 3/044* (2023.01); *G06N 3/08* (2013.01); *G10L 2015/088* (2013.01)

(58) Field of Classification Search
CPC . G10L 15/16; G10L 2015/088; G06N 3/0445; G06N 3/08
See application file for complete search history.

(56) References Cited

U.S. PATENT DOCUMENTS

| | | | |
|---|---|---|---|
| 11,170,287 B2* | 11/2021 | Zhong | G06N 3/0445 |
| 2019/0019037 A1* | 1/2019 | Kadav | G06K 9/6262 |
| 2019/0287012 A1* | 9/2019 | Celikyilmaz | G06N 3/0445 |
| 2019/0318725 A1* | 10/2019 | Le Roux | G10L 15/063 |
| 2020/0027444 A1* | 1/2020 | Prabhavalkar | G10L 25/30 |
| 2020/0082807 A1* | 3/2020 | Kim | G06N 3/04 |

(Continued)

OTHER PUBLICATIONS

Tao et al., "Get The Point of My Utterance! Learning Towards Effective Responses with Multi-Head Attention Mechanism", Proceedings of the Twenty-Seventh International Joint Conference on Artificial Intelligence (IJCAI-18), pp. 4418-4424 (Year: 2018).*

(Continued)

*Primary Examiner* — Bhavesh M Mehta
*Assistant Examiner* — Edward Tracy, Jr.
(74) *Attorney, Agent, or Firm* — QUALCOMM Incorporated; Espartaco Diaz Hidalgo

(57) ABSTRACT

A method for operating a neural network includes receiving an input sequence at an encoder. The input sequence is encoded to produce a set of hidden representations. Attention-heads of the neural network calculate attention weights based on the hidden representations. A context vector is calculated for each attention-head based on the attention weights and the hidden representations. Each of the context vectors correspond to a portion of the input sequence. An inference is output based on the context vectors.

28 Claims, 7 Drawing Sheets

(56) References Cited

U.S. PATENT DOCUMENTS

| | | | | |
|---|---|---|---|---|
| 2020/0210526 A1* | 7/2020 | Leibovitz | ................ | G06N 3/08 |
| 2020/0265466 A1* | 8/2020 | Cheng | ................ | G06Q 30/0246 |
| 2020/0356729 A1* | 11/2020 | Duan | ................... | G06F 16/258 |
| 2021/0182504 A1* | 6/2021 | Tu | ........................... | G06F 40/10 |
| 2021/0271975 A1* | 9/2021 | Chen | ........................ | G06N 3/08 |
| 2022/0051099 A1* | 2/2022 | Shazeer | ................ | G06N 3/045 |

OTHER PUBLICATIONS

Chowdhury F.A.R., et al., "Attention-Based Models for Text-Dependent Speaker Verification", arXiv:1710.10470v3, Jan. 31, 2018, 5 Pages.

Shan C., et al., "Attention-Based End-to-End Models for Small-Footprint Keyword Spotting", arXiv:1803.10916v1, Mar. 29, 2018, 5 Pages.

Vaswani A., et al., "Attention Is All You Need", arXiv:1706.03762v5, Dec. 6, 2017, 15 Pages.

* cited by examiner

ORTHOGONALLY CONSTRAINED MULTI-HEAD ATTENTION FOR SPEECH TASKS

CROSS-REFERENCE TO RELATED APPLICATION

The present application claims priority to U.S. Provisional Patent Application No. 62/870,382, filed on Jul. 3, 2019, and titled "ORTHOGONALLY CONSTRAINED MULTI-HEAD ATTENTION FOR SPEECH TASKS," the disclosure of which is expressly incorporated by reference herein in its entirety.

BACKGROUND

Field

Aspects of the present disclosure generally relate to speech recognition and more particularly to keyword detection in a continuous audio stream.

Background

Keyword spotting systems can determine whether a predefined keyword is present in a segment of continuous speech. Conventional non-end-to-end keyword spotting uses sequence models, such as a Hidden Markov Model (HMM), which rely on computationally expensive sequence matching algorithms (e.g., Viterbi decoding), and often specify time alignments in training.

In many tasks, such as machine translation or dialogue generation, a sequence of words is used as an input (e.g., original text in English) and it is desirable to generate another sequence of words as an output (e.g., a translation to Korean). Neural networks, especially recurrent neural networks (RNNs), are well suited for solving such a task.

The "sequence-to-sequence" neural network models are widely used for natural language processing (NLP). A popular type of these models is an "encoder-decoder." There, one part of the network encoder encodes the input sequence into a fixed-length context vector. This vector is an internal representation of the text. This context vector is then decoded into the output sequence by the decoder. However, there are some deficiencies associated with the encoder-decoder approach. For example, compressing all of the information of an input source sentence (by a neural network) into a fixed-length vector leads to a decline in performance when dealing with long sentences.

Attention based detection and classification tasks for speech have been widely accepted and it is known to help improve many sequence based models. For example, each time a model predicts an output word, it only uses parts of an input where the most relevant information is concentrated, instead of an entire sentence. In other words, it only pays attention to some input words. Attention based detection and classification tasks for speech include an attention based speaker verification model and an attention based keyword spotting model. An attention based speaker verification model proposal may include a non-linear shared parameter attention mechanism with a single head to the speaker verification task. An attention based keyword spotting model may apply the attention mechanism of the attention based speaker verification model to a keyword spotting task. Both models only have one context vector, which summarizes encoder outputs over the whole time frame, and thus cannot take into account detailed information of sequence parts.

Multi-head attention based systems are proposed to alleviate this issue. For example, the proposed multi-head attention based systems replace convolutional neural networks (CNNs) and recurrent neural networks (RNNs) by self-attention networks for speech tasks. Thus, instead of using single attention, the network uses multiple head attention mechanisms in parallel and concatenates the outputs while keeping the original dimension. For example, a dimension size of five hundred and twelve (512) based on a single attention-head corresponds to a dimension size of sixty-four (64) based on eight (8) attention-heads. However, there is no consideration of relation between attention-heads, and accordingly, only using multi-head attention may produce information redundancy across the attention-heads in either position or context.

SUMMARY

In an aspect of the present disclosure, a method for operating a neural network is provided. The method includes receiving an input sequence at an encoder. The method also includes encoding the input sequence to produce hidden representations. Additionally, the method includes calculating attention weights in attention-heads of the neural network based on the hidden representations. Further, the method includes calculating a context vector for each attention-head based on the attention weights and the hidden representations. Each context vector corresponds to a portion of the input sequence. Furthermore, the method includes outputting an inference based on the context vectors.

In another aspect of the present disclosure, an apparatus for operating a neural network is provided. The apparatus includes a memory and one or more processors coupled to the memory. The processor(s) are configured to receive an input sequence at an encoder. The processor(s) are also configured to encode the input sequence to produce hidden representations. In addition, the processor(s) are configured to calculate attention weights in attention-heads of the neural network based on the hidden representations. Further, the processor(s) are configured to calculate a context vector for each attention-head based on the attention weights and hidden representations. Each context vector corresponds to a portion of the input sequence. Furthermore, the processor(s) are configured to output an inference based on the context vector.

In yet another aspect of the present disclosure, an apparatus for operating a neural network is provided. The apparatus includes means for receiving an input sequence at an encoder. The apparatus also includes means for encoding the input sequence parts to produce hidden representations. Additionally, the apparatus includes means for calculating attention weights in attention-heads of the neural network based on the hidden representations. Further, the apparatus includes means for calculating a context vector for each attention-head based on the attention weights and the hidden representations. Each context vector corresponds to a portion of the input sequence. Furthermore, the apparatus includes means for outputting an inference based on the context vectors.

In a further aspect of the present disclosure, a non-transitory computer readable medium is provided. The computer readable medium has encoded thereon program code for operating a neural network. The program code is executed by a processor and includes code to receive an input sequence at an encoder. The program code also includes code to encode the input sequence to produce hidden representations. In addition, the program code includes code to calculate attention weights in attention-heads of the neural network based on the hidden representations. Further, the program code includes code to calculate a context vector for each attention-head based on the attention weights and the hidden representations. Each context vector corresponds to a portion of the input sequence. Furthermore, the program code includes code to output an inference based on the context vector.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
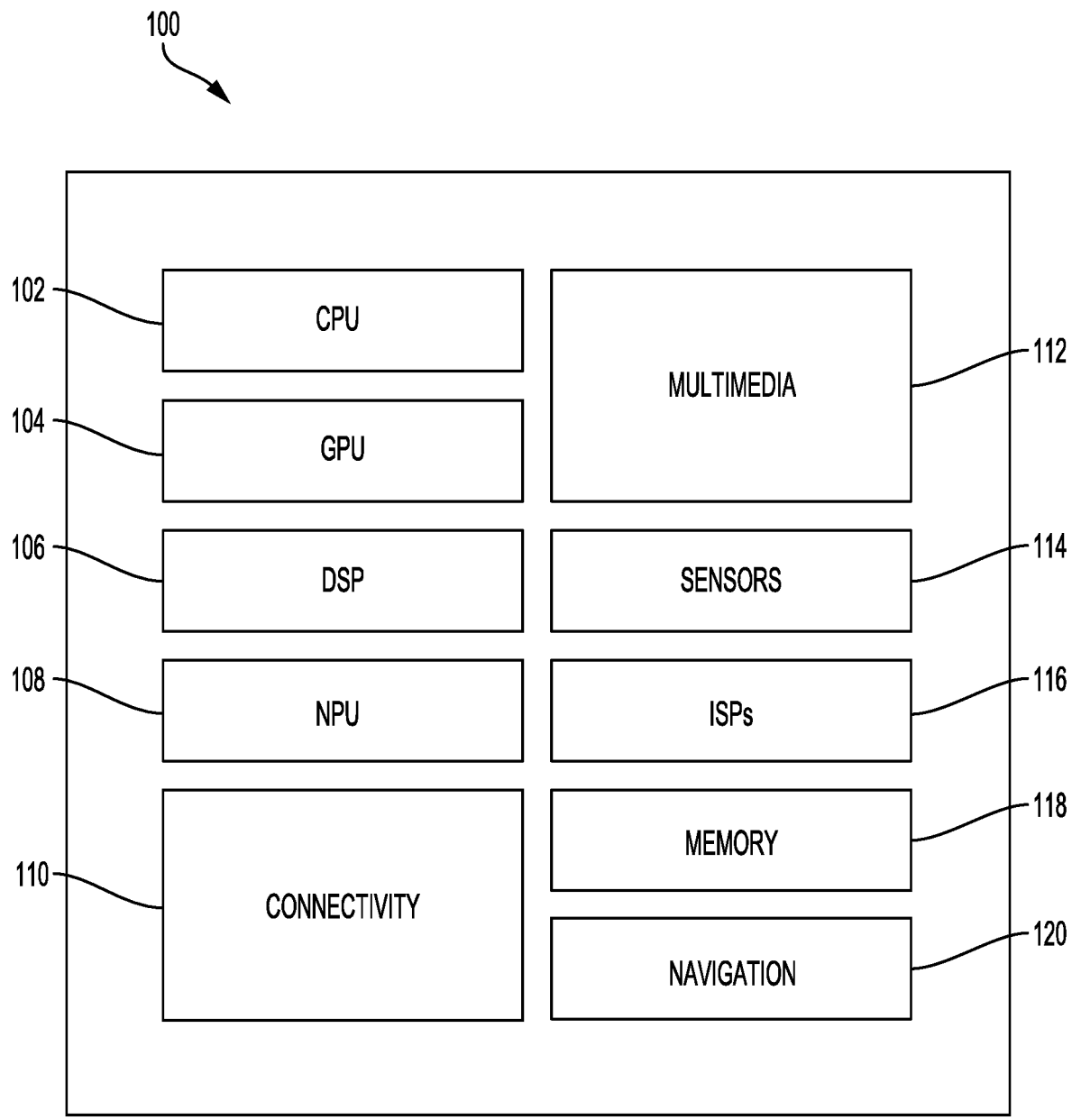
FIG. 1 illustrates an example implementation of a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Keyword spotting has recently become an essential function of consumer devices, such as mobile phones and smart speakers, because it provides a natural way voice user interface. It is useful for detecting pre-defined keywords (e.g., "Alexa," "Hey Siri," and "OK Google") for getting devices ready to process users' following commands or queries. Despite the widespread use of this technology in various devices today, it remains a challenging problem to provide keyword detection with a low false rejection rate (FRR) and false alarm rate (FAR) while operating with a small memory footprint and low power consumption.

Aspects of the present disclosure improve performance of detection and classification tasks with an all-neural end-to-end network. A neural network accepts an input from one end, and produces an output at the other end. The learning that optimizes the network weights by considering the inputs and outputs directly is called end-to-end learning. Aspects of the present disclosure separate and fully utilize sequence part information, instead of whole sequences at once, without using explicit sequence modeling, which usually incorporates assumptions. Aspects of the present disclosure further de-correlate encoder outputs so that the encoder learns specific representations for a corresponding sequence part.

The methods and systems of the present disclosure use multi-head attention mechanisms with regularization based on orthogonality constraints between context vectors of attention-heads, which take the encoder network outputs as inputs. The methods and systems of the present disclosure also use multi-head attention mechanisms with regularization based on orthogonality constraints between attention weights of attention-heads, which take the encoder network outputs as inputs. The methods and system may be applied to speech tasks such as keyword spotting, speaker verification and automatic speech recognition.

Regularization may reduce overfitting and consequently improve a model's performance. For example, adding a regularization mechanism drives values of the weight matrix down. This will effectively de-correlate the neural network. A capacity of a neural network model, its complexity, is defined by both its structure in terms of nodes and layers and the parameters in terms of its weights. Therefore, the complexity of the neural network can be reduced to reduce overfitting. For example, the complexity can be changed (e.g., reduced) by changing the network structure (number of weights) and/or changing the network parameters (values of weights).

In some implementations the complexity of the model may be constrained by ensuring the parameters (weights) of the model remain small. Small parameters suggest a less complex and, in turn, more stable model that is less sensitive to statistical fluctuations in the input data.

FIG. 1 illustrates an example implementation of a system-on-a-chip (SOC) 100, which may include a central processing unit (CPU) 102 or a multi-core CPU configured for regularizing a neural network (e.g., a neural end-to-end network) based on a multi-head attention model. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may include code to receive an input sequence at an encoder. The general-purpose processor 102 may also include encode the input sequence to produce hidden representations. The general-purpose processor 102 may also include code to calculate attention weights in attention-heads of the neural network based on the hidden representations. The general-purpose processor 102 may further include code to calculate a context vector for each attention-head based on the attention weights and the hidden representations. Each context vector correspond to a portion of the input sequence. Furthermore, the general-purpose processor 102 includes code to output an inference based on the context vectors.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
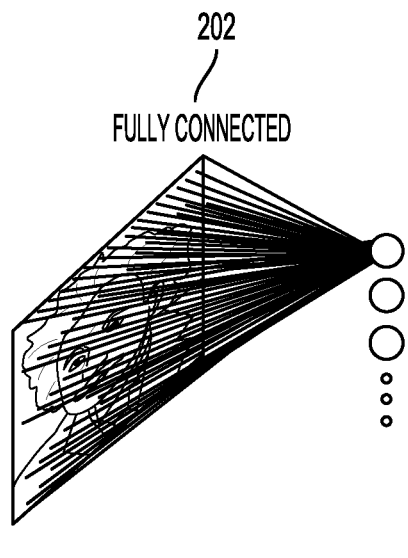
FIGS. 2A, 2B, and 2C are diagrams illustrating a neural network in accordance with aspects of the present disclosure.
Figure 2B:
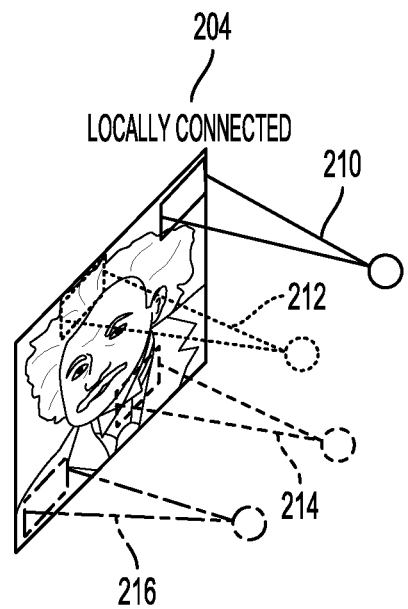

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
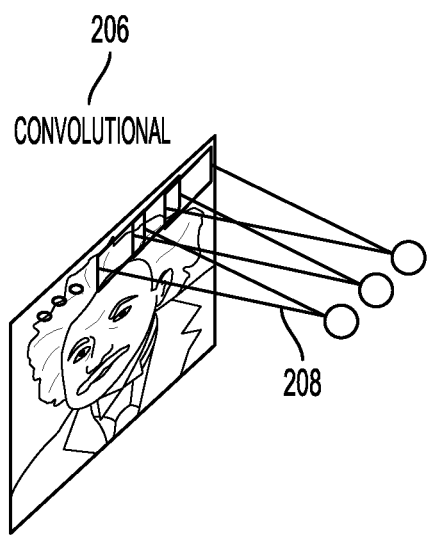

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
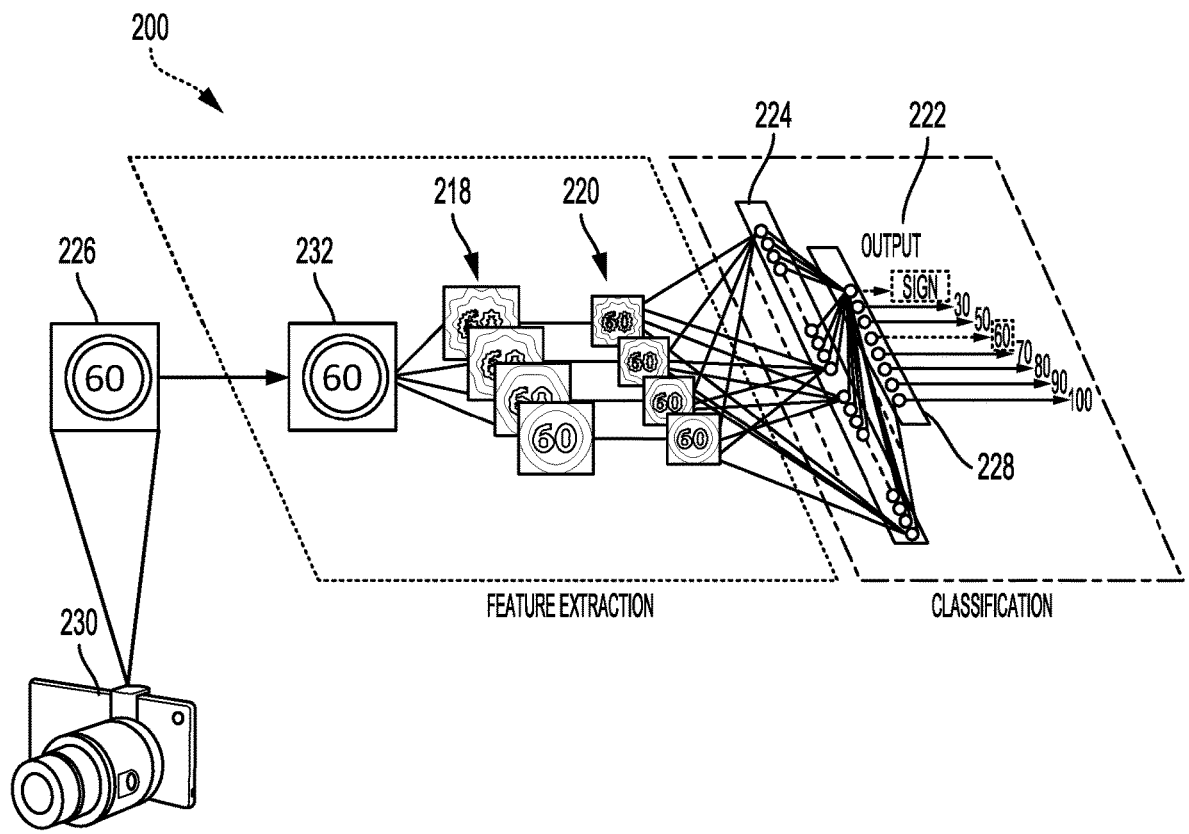
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
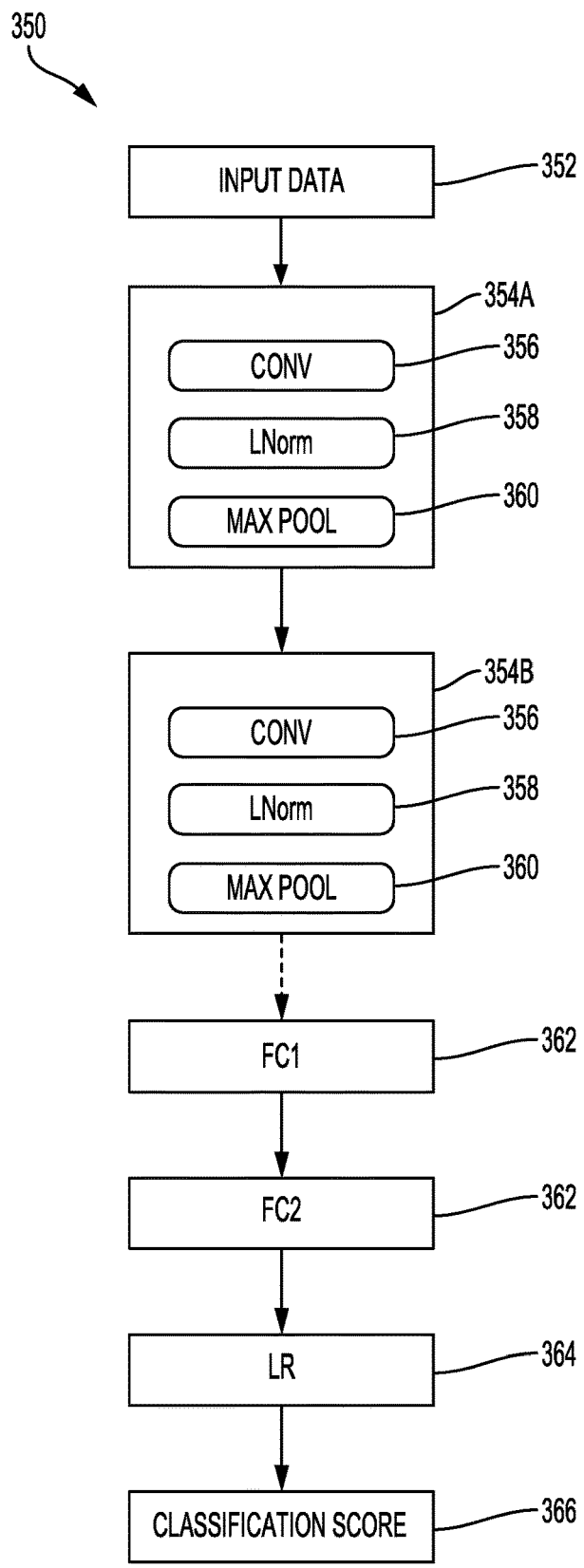
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4A:
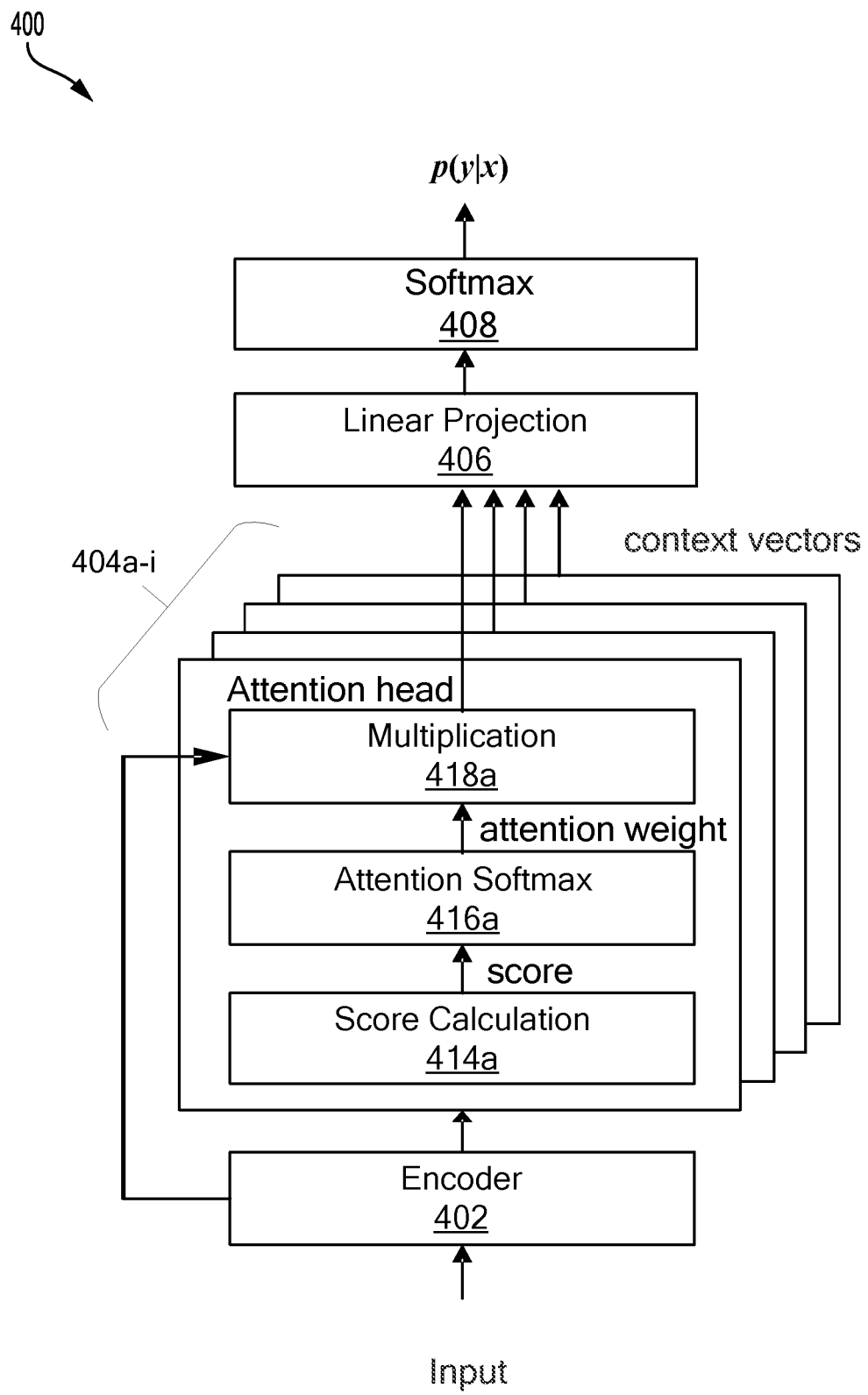
FIGS. 4A-B are block diagrams respectively illustrating inference and training of an end-to-end keyword spotting network in accordance with aspects of the present disclosure.
Figure 4B:
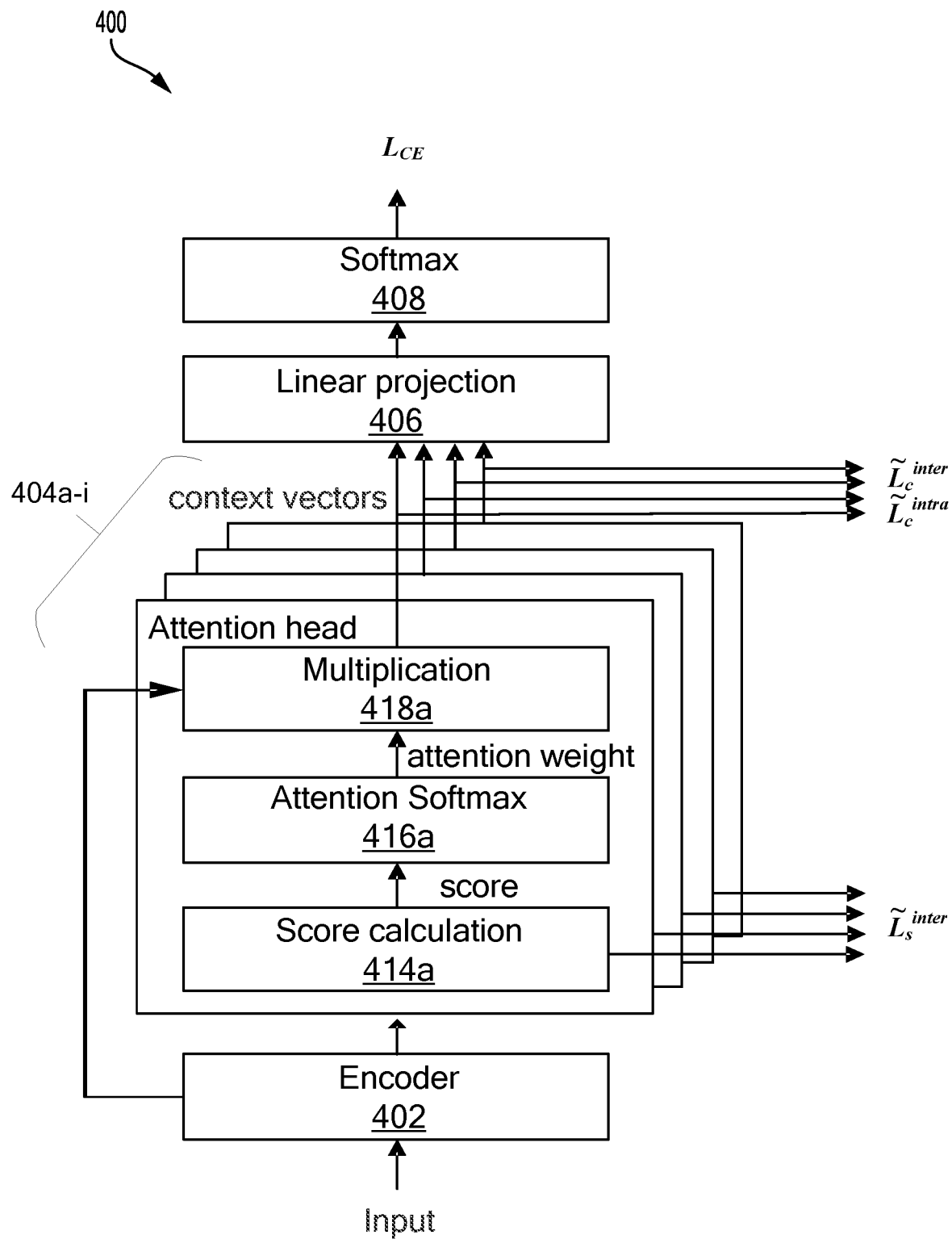

FIGS. 4A-B are block diagrams respectively illustrating inference and training of an end-to-end keyword spotting network 400 in accordance with aspects of the present disclosure. Referring to FIG. 4A, the keyword spotting network 400 includes an encoder 402, attention-heads 404a-i, a linear projection unit 406, and a softmax unit 408. The encoder 402 receives, as an input, an acoustic feature x[t], t=1, 2, . . . , T, where t is the time frame index. In one example, the input may be a 40-dimensional Mel-filter bank energies extracted from 16 kHz sampled audio signals with per-channel energy normalization.

The encoder 402 may convert the input sequence into a hidden representation h[t]. In some aspects, the encoder 402 may be implemented using an artificial neural network. For example, the encoder 402 may be implemented using a canonical convolutional recurrent neural network (CRNN) structure with convolutional and recurrent layers in sequence. As such, the encoder 402 may be configured to capture spectral as well as temporal characteristics of the input acoustic features. In one example, the encoder 402 may include one convolutional layer with a kernel size of 5×20 and a stride of 2×1, and one gated recurrent unit (GRU) layer with 64 hidden units.

The encoder 402 outputs a vector h[t] (e.g., the hidden representations) to each of the attention-heads 404a-i. For ease of illustration, the inputs to subsequent attention-heads 404b-i are not shown. Each of the attention-heads 404a-i, respectively includes a score calculation unit 414a-i, an attention softmax unit 416a-i, and a multiplication unit 418a-i. The attention-heads 404a-i process the hidden representations to produce a context vector c, where i denotes the attention-head index.

The attention-heads 404a-i equip the neural network with the ability to focus on a subset of inputs (acoustic features, for example). In each attention-head 404a-i, a nonlinear soft attention mechanism may provide speaker verification and keyword spotting. The score calculation unit 414a-i calculates a scalar score $e_i$ [t] based on the hidden representation h[t]. The scalar score $e_i$ [t] is provided to the attention softmax unit 416a-i, which, in turn, applies a softmax function to the scalar score $e_i$ [t] to calculate an attention weight $\alpha_i[t]$. The attention weight $\alpha_i[t]$ may be calculated for the i-th attention-head at the t-th time frame by:

$$\alpha_i[t] = \frac{\exp(e_i[t])}{\sum_{\tau=1}^{T}\exp(e_i[\tau])} \qquad (1)$$

where the scalar score $e_i$ [t] is calculated by the score calculation units 414a-i. The score calculation units 414a-i apply a nonlinear scoring function with the parameters shared across time as follows:

$$e_i[t] = v_i^T \tan h(W_i h[t] + b_i) \qquad (2)$$

where $v_i^T$ is a scalar projection, $W_i$ is a weight, and $b_i$ is a bias, each of which are learnable parameters.

Multiplication units 418a-i receive the output of encoder 402 (e.g., hidden representation h[t]) and the attention weights $\alpha_i[t]$, and performs a multiplication operation to compute a context vector $c_i$. Accordingly, each attention-head 404*a-i* may output a context vector $c_i$, which may be calculated by the weighted sum as follows:

$$c_i = \sum_{t=1}^{T} \alpha_i[t]h[t] \quad (3)$$

Each of the context vectors may correspond to a portion of the input sequence. In some aspects, the attention-heads 404*a-i* may also concatenate the context vectors $c_i$, as $c=[c_1^T, c_2^T, \ldots, c_H^T]^T$, where $^T$ denotes the matrix transpose. The context vectors are supplied to the linear projection unit 406. The linear projection unit 406 transforms the context vectors $c_i$, into a linear projection. A softmax unit 408 applies a softmax function to the context vectors c to compute a posterior probability of a keyword state y given an input observation x, p(y|x). Accordingly, the keyword spotting network 400 performs binary classification based on the posterior probability p(y|x). In the inference stage, a keyword may be detected when the confidence p(y|x) is larger than a previously determined threshold and not detected when the confidence p(y|x) is below the threshold. Notably, the keyword spotting network 400 may be operated to determine an inference without graph searching or frame-level alignment of training data, which may greatly simplify both training and inference.

In accordance with aspects of the present disclosure, multi-head attention mechanisms in speech recognition tasks include keyword spotting to capture the structured information from speech subsequences while keeping the end-to-end nature.

Multi-head attention is capable of diverse learning of representations because different heads can pay attention to different positions in a sequence and give different representations. However, the diversity is not guaranteed by its natural form as they may have redundancy either in position or representation. Accordingly, to encourage the diversity of the multi-head attention, disagreement regularization in the context of machine translation may be employed. For example, the disagreement regularization may include disagreements on subspaces, attended positions and outputs, and based on maximization of the negative cosine similarities. Referring to FIG. 4B, a regularization technique for training the multi-head attention-based keyword spotting network 400 is provided by applying orthogonality constraints between attention-heads.

In order to capture the temporally structured information in a speech input sequence x(t), the attention-heads (e.g., 404*a-i*) should pay attention to different parts of the speech input sequence and produce context outputs (e.g., context vector $c_i$) with little redundancy with each other. That is, the context vectors may correspond to portions of the input sequence. To achieve this, regularization of the multi-head attention may be achieved by applying orthogonality constraints on context vectors $c_i$ and score vectors $e_i[t]$ between the attention-heads (404*a-i*). Thus, training is performed to find the network parameters that minimize the cross entropy loss $L_{CE}$ subject to the orthogonality constraints $c_i \perp c_j$ and $e_i \perp e_j$ for each pair of i≠j, where $\perp$ is an operator that indicates the operands are orthogonal or exclusive of each other. Given a training batch of N samples, regularization terms $L_c^{inter}$ and $L_s^{inter}$ may be defined by:

$$L_c^{inter} = \frac{1}{N}\sum_{n=1}^{N} \frac{1}{H(H-1)} \left\| C^{(n)T}C^{(n)} - I_H \right\|_F^2 \quad (4)$$

$$L_s^{inter} = \frac{1}{N}\sum_{n=1}^{N} \frac{1}{H(H-1)} \left\| E^{(n)T}E^{(n)} - I_H \right\|_F^2 \quad (5)$$

where n is the sample index, H is the number of attention-heads, $\|\cdot\|_F^2$ denotes the Frobenium norm, and:

$$C^{(n)} = [\bar{c}_1^{(n)}, \bar{c}_2^{(n)}, \ldots \bar{c}_H^{(n)}] \text{ with } \bar{c}_i^{(n)} = c_i^{(n)}/\|c_i^{(n)}\| \quad (6)$$

$$E^{(n)} = [\bar{e}_1^{(n)}, \bar{e}_2^{(n)}, \ldots \bar{e}_H^{(n)}] \text{ with } \bar{e}_i^{(n)} = c_i^{(n)}/\|e_i^{(n)}\| \quad (7)$$

are the context matrix and the score matrix, respectively, which are the normalized context vectors $\bar{c}_i$ and the normalized score vectors $\bar{e}_i$.

Notably, the regularization may be performed without using value projection. As such, the keyword spotting network 400 may directly compute the context vector $c_i$ from the encoder output (hidden representation h[t]) by multiplying the attention weights $\alpha_i[t]$. That is, orthogonality may be achieved by the encoder 402, rather than the subspace projection. This encourages the encoder 402 to discriminately represent different subsequences of a keyword utterance, which may result in improved keyword detection.

Because each attention-head 404*a-i* finds a specific subsequence with similar content, the context vectors $c_i$ from the same attention-head (e.g., 404*a-i*) are expected to be similar across different samples. Thus, a regularization term may be augmented to maximize the similarity or non-orthogonality of the context vectors $c_i$ between different samples from the same attention-head (e.g., 404*a-i*), as follows:

$$L_c^{intra} = \frac{1}{H}\sum_{i=1}^{N} \frac{1}{N(N-1)} \left\| \tilde{C}_i^T \tilde{C}_i - I_N \right\|_F^2 \quad (8)$$

where:

$$\tilde{C}_i = [\bar{c}_i^{(1)}, \bar{c}_i^{(2)}, \ldots, \bar{c}_i^{(N)}] \quad (9)$$

However, similar regularization to score vectors $\bar{e}_i$ is not considered. This is because the position of a subsequence attended by each attention-head can vary from sample to sample. That is, score vectors $\bar{e}_i$ may have different absolute patterns for positive samples. For instance, some samples have a specific subsequence (e.g., A in Alexa) at the very beginning of a time window while others may have the specified subsequence near the center of the time window. Nevertheless, in some aspects, where the absolute temporal positions of the subsequences are very close across different samples such regularization may be applied.

Because the orthogonality and non-orthogonality constraints are only valid for positive data, (for example, keyword utterances) Equations (4), (5) and (8) may be modified to be selectively calculated, given that the true label $y^{(n)}$ of the n-th training sample is 1 for positive and 0 for negative (for example, background noise) as follows:

$$\tilde{L}_c^{inter} = \frac{1}{N_P}\sum_{n=1}^{N} \frac{y^{(n)}}{H(H-1)} \left\| C^{(n)T}C^{(n)} - I_H \right\|_F^2 \quad (10)$$

-continued $$\tilde{L}_c^{intra} = \frac{1}{H}\sum_{n=1}^{H}\frac{1}{N_P(N_P-1)}\left\|Y\left(\tilde{C}_i^T\tilde{C}_i - I_N\right)Y\right\|_F^2 \quad (11)$$

$$\tilde{L}_s^{inter} = \frac{1}{N_P}\sum_{n=1}^{N}\frac{y^{(n)}}{H(H-1)}\left\|E^{(n)T}E^{(n)} - I_H\right\|_F^2 \quad (12)$$

where $N_P$ denotes the number of positive samples and Y is the diagonal selection matrix diag $(y^{(0)}, y^{(1)}, \ldots, y^{(N)})$. The problem may be provided as a minimization of the cross entropy loss $L_{CE}$ with the regularization terms as follows:

$$\theta^* = \underset{\theta}{\operatorname{argmin}}\{L_{CE} + \lambda_1\tilde{L}_c^{inter} - \lambda_2 L_c^{intra} + \lambda_3\tilde{L}_s^{inter}\} \quad (13)$$

where each $\lambda_i$ is a hyperparameter that controls the importance of the corresponding regularization term. Note that $L_c^{intra}$ has the opposite sign, because this regularization term is to be maximized while the others are to be minimized.

In some aspects, a semi-supervised way of learning representations of salient features from keyword utterances for the given task may also be provided. In other words, without the sequence part alignment information, such as phoneme labels and frame indices, the encoder 402 may find task-relevant subsequences, which may distinguish keywords from non-keywords while only the keyword label is provided.

Accordingly, the multi-head attention-based keyword spotting network 400 may be trained with regularization derived from orthogonality constraints on context vectors $c_i$ and score vectors $e_i$ of attention-heads 404a-i. The inter-head orthogonality regularization of context vectors ($\tilde{L}_c^{inter}$) and score vectors ($\tilde{L}_s^{inter}$) may encourage the attention-heads 404a-i to have less redundancy to each other in positions and subspaces, while the intra-head non-orthogonality regularization of context vectors ($\tilde{L}_c^{intra}$) allows for contextual consistency across samples for the given task. Accordingly, the attention-heads (404a-i) may serve as an orthogonality constrained multi-head attention mechanism and may learn an exclusive representation of sequence parts both in position and in subspaces, which in turn improves the keyword spotting performance by extracting richer task-relevant information from structured data.

Figure 5:
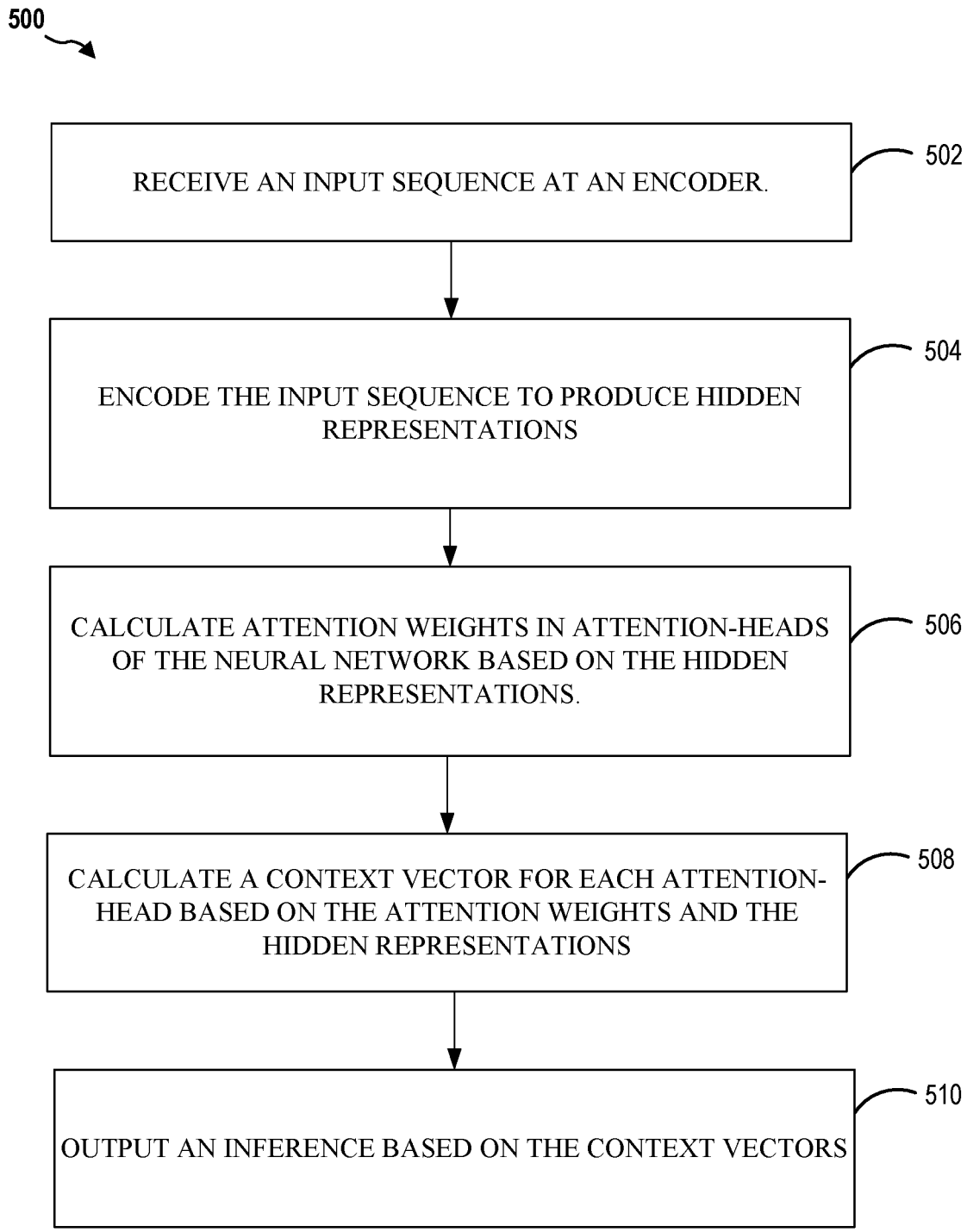
FIG. 5 illustrates a method for operating a neural network, in accordance with aspects of the present disclosure.

FIG. 5 illustrates a method 500 for operating a neural network, in accordance with aspects of the present disclosure. As shown in FIG. 5, at block 502, the process receives an input sequence at an encoder. Referring to FIG. 4A, the encoder 402 receives, as an input, an acoustic feature x[t], t=1, 2, . . . , T, where t is the time frame index. In one example, the input may be a 40-dimensional Mel-filter bank energies extracted from 16 kHz sampled audio signals with per-channel energy normalization.

At block 504, the process encodes the input sequence to produce hidden representations. As described in relation to FIG. 4A, the encoder 402 may convert the input sequence into a hidden representation h[t]. In some aspects, the encoder 402 may be implemented using an artificial neural network. For example, the encoder 402 may be implemented using a canonical convolutional recurrent neural network (CRNN) structure with convolutional and recurrent layers in sequence. As such, the encoder 402 may be configured to capture spectral as well as temporal characteristics of the input acoustic features. In one example, the encoder 402 may include one convolutional layer with a kernel size of 5×20 and a stride of 2×1, and one gated recurrent unit (GRU) layer with 64 hidden units.

At block 506, the process calculates attention weights in attention-heads of the neural network based on the hidden representations. As shown in FIG. 4A, each attention-head 404a-i includes a nonlinear soft attention mechanism that may provide speaker verification and keyword spotting. The score calculation units 414a-i calculate a scalar score $e_i$ [t] based on the hidden representation h[t]. The scalar score $e_i$ [t] is provided to the attention Softmax unit 416a-i, which, in turn, applies a Softmax function to the scalar score $e_i$ [t] to calculate an attention weight $\alpha_i$[t].

At block 508, the process calculates a context vector for each attention-head based on the attention weights and the hidden representations. Each context vector corresponds to a portion of the input sequence. As shown in FIG. 4A, the multiplication units 418a-i receive the hidden representation h[t] and the attention weights $\alpha_i$[t], and performs a multiplication operation to compute context vector $c_i$.

At block 510, the process outputs an inference based on the context vectors. As discussed with reference to FIG. 4A, the context vectors are supplied to the linear projection unit 406. The linear projection unit 406 transforms the context vectors $c_i$ into a linear projection. A softmax unit 408 applies a softmax function to the context vectors c to compute a posterior probability of a keyword state y given an input observation x, p(y|x). Accordingly, the keyword spotting network 400 performs binary classification based on the posterior probability p(y|x). In the inference stage, a keyword may be detected when the confidence p(y|x) is larger than a previously determined threshold and not detected when the confidence p(y|x) is below the threshold. Notably, the keyword spotting network 400 may be operated to determine an inference without graph searching or frame-level alignment of training data.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A processor-implemented method for operating a neural network, the method comprising:
    receiving an input sequence at an encoder;
    encoding the input sequence to produce a set of hidden representations of time frame t;
    providing the set of hidden representations to each of a plurality of attention heads of the neural network, each of the plurality of attention heads configured to focus on a different subset of the set of hidden representations;
    calculating corresponding attention weights for each of the different subsets of the set of hidden representations of time frame t in each attention head of the plurality of attention-heads based on a corresponding score, each score being computed based on a nonlinear scoring function of the set of hidden representations of time frame t and learnable parameters;
    calculating a context vector for each attention-head based on the attention weights of time frame t and the set of hidden representations of time frame t, each context vector corresponding to a portion of the input sequence; and
    outputting an inference based on the context vectors.

2. The processor-implemented method of claim 1, in which the input sequence comprises an acoustic feature and the inference includes an indication of whether a keyword is included in a corresponding portion of the input sequence.

3. The processor-implemented method of claim 1, in which each of the context vectors are orthogonal to other context vectors of other attention-heads.

4. The processor-implemented method of claim 1, in which the set of scores are computed based on a scalar projection.

5. The processor-implemented method of claim 1, further comprising selectively regularizing the neural network based on orthogonality constraints of the attention weights and the context vectors.

6. The processor-implemented method of claim 5, in which the selectively regularizing further comprises calculating regularization terms only for positive samples in the input sequence.

7. The processor-implemented method of claim 1, in which the nonlinear scoring function is computed based on a scalar projection, a weight and a bias, where the learnable parameters include the scalar projection, the weight and the bias.

8. The processor-implemented method of claim 1, further comprising applying a softmax function to each of the context vectors to compute a posterior probability of a keyword state being in a corresponding portion of the input sequence.

9. The processor-implemented method of claim 8, further comprising detecting a keyword responsive to the posterior probability of the keyword state being in a corresponding portion of the input sequence is above a predefined threshold.

10. An apparatus for operating a neural network, the apparatus comprising:
    a memory configured to store one or more parameters of the neural network; and
    at least one processor coupled to the memory, the at least one processor being configured:
        to receive an input sequence at an encoder;
        to encode the input sequence to produce a set of hidden representations of time frame t;
        to provide the set of hidden representations to each of a plurality of attention heads of the neural network, each of the plurality of attention heads configured to focus on a different subset of the set of hidden representations;
        to calculate corresponding attention weights for each of the different subsets of the set of hidden representations of time frame t in each attention head of the plurality of attention-heads based on a corresponding score, each score being computed based on a nonlinear scoring function of the set of hidden representations of time frame t and learnable parameters, the learnable parameters being stored in the memory;

to calculate a context vector for each attention-head based on the attention weights of time frame t and the set of hidden representations of time frame t, each context vector corresponding to a portion of the input sequence; and to output an inference based on the context vectors.

11. The apparatus of claim 10, in which the input sequence comprises an acoustic feature and the at least one processor is further configured to output an inference indicating whether a keyword is included in a corresponding portion of the input sequence.

12. The apparatus of claim 10, in which each of the context vectors are orthogonal to other context vectors of other attention-heads.

13. The apparatus of claim 10, in which the at least one processor is further configured to compute the set of scores based on a scalar projection.

14. The apparatus of claim 10, in which the at least one processor is further configured to selectively regularize the neural network based on orthogonality constraints of the attention weights and the context vectors.

15. The apparatus of claim 14, in which the at least one processor is further configured to calculate regularization terms only for positive samples in the input sequence.

16. The apparatus of claim 10, in which the nonlinear scoring function is computed based on a scalar projection, a weight and a bias, where the learnable parameters include the scalar projection, the weight and the bias.

17. An apparatus for operating a neural network, the apparatus comprising:
    means for receiving an input sequence at an encoder;
    means for encoding the input sequence to produce a set of hidden representations of time frame t;
    means for providing the set of hidden representations to each of a plurality of attention heads of the neural network, each of the plurality of attention heads configured to focus on a different subset of the set of hidden representations;
    means for calculating corresponding attention weights for each of the different subsets of the set of hidden representations of time frame t in each attention head of the plurality of attention-heads based on a corresponding score, each score being computed based on a nonlinear scoring function of the set of hidden representations of time frame t and learnable parameters;
    means for calculating a context vector for each attention-head based on the attention weights of time frame t and the set of hidden representations of time frame t, each context vector corresponding to a portion of the input sequence; and
    means for outputting an inference based on the context vectors.

18. The apparatus of claim 17, in which the input sequence comprises an acoustic feature and further comprising means for outputting an inference indicating whether a keyword is included in a corresponding portion of the input sequence.

19. The apparatus of claim 17, in which each of the context vectors are orthogonal to other context vectors of other attention-heads.

20. The apparatus of claim 17, further comprising means for computing the set of scores based on a scalar projection.

21. The apparatus of claim 17, further comprising means for selectively regularizing the neural network based on orthogonality constraints of the attention weights and the context vectors.

22. The apparatus of claim 21, further comprising means for calculating regularization terms only for positive samples in the input sequence.

23. The apparatus of claim 17, in which the at least one processor is further configured to detect a keyword responsive to the posterior probability of the keyword state being in a corresponding portion of the input sequence is above a predefined threshold.

24. The apparatus of claim 17, in which the attention heads are configured to perform an speech recognition task, a speaker verification task or a keyword spotting task.

25. A non-transitory computer readable medium having encoded thereon program code for operating a neural network, the program code being executed by a processor and comprising:
    program code to receive an input sequence at an encoder;
    program code to separate the input sequence into sequence parts;
    program code to encode the sequence parts to produce a set of hidden representations of time frame t;
    program code to provide the set of hidden representations to each of a plurality of attention heads of the neural network, each of the plurality of attention heads configured to focus on a different subset of the set of hidden representations;
    program code to calculate corresponding attention weights for each of the different subsets of the set of hidden representations of time frame t in each attention head of the plurality of attention-heads based on a corresponding score, each score being computed based on a nonlinear scoring function of the set of hidden representations of time frame t and learnable parameters;
    program code to calculate a context vector for each attention-head based on the attention weights of time frame t and the set of hidden representations of time frame t, each context vector corresponding to a portion of the input sequence; and
    program code to output an inference based on the context vectors.

26. The non-transitory computer readable medium of claim 25, in which the input sequence comprises an acoustic feature and further comprising program code to output an inference indicating whether a keyword is included in a corresponding portion of the input sequence.

27. The non-transitory computer readable medium of claim 25, in which each of the context vectors are orthogonal to other context vectors of other attention-heads.

28. The non-transitory computer readable medium of claim 25, further comprising program code to selectively regularize the neural network based on orthogonality constraints of the attention weights and the context vectors.

* * * * *